Figure 1:
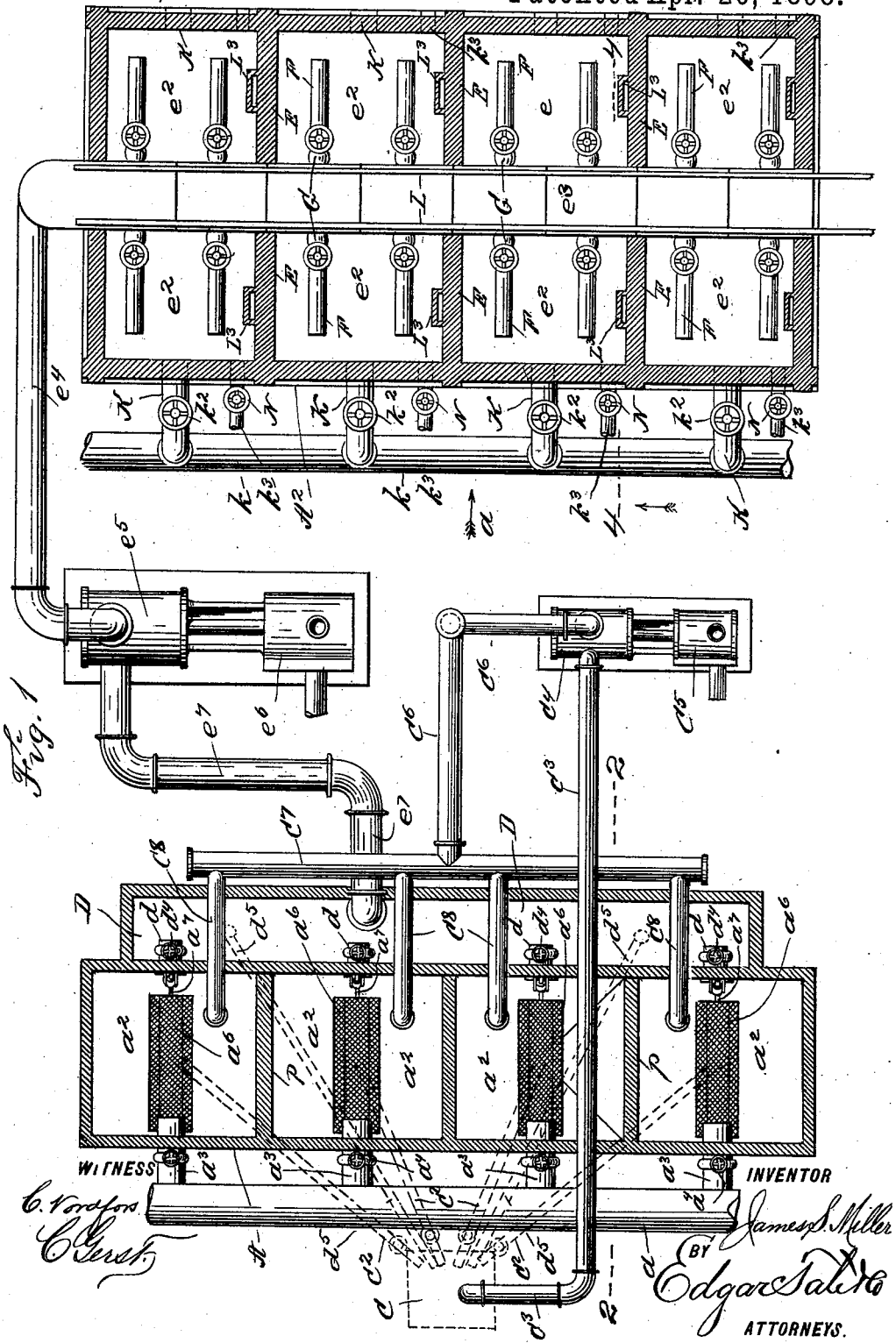

(No Model.)   3 Sheets—Sheet 1.

J. S. MILLER.
APPARATUS FOR PURIFYING SEWAGE WATER.

No. 603,221. Patented Apr. 26, 1898.

WITNESS
C. Vordfor
C. Gerst

INVENTOR
James S. Miller
BY
Edgar Tate
ATTORNEYS.

(No Model.) 3 Sheets—Sheet 2.
J. S. MILLER.
APPARATUS FOR PURIFYING SEWAGE WATER.
No. 603,221. Patented Apr. 26, 1898.
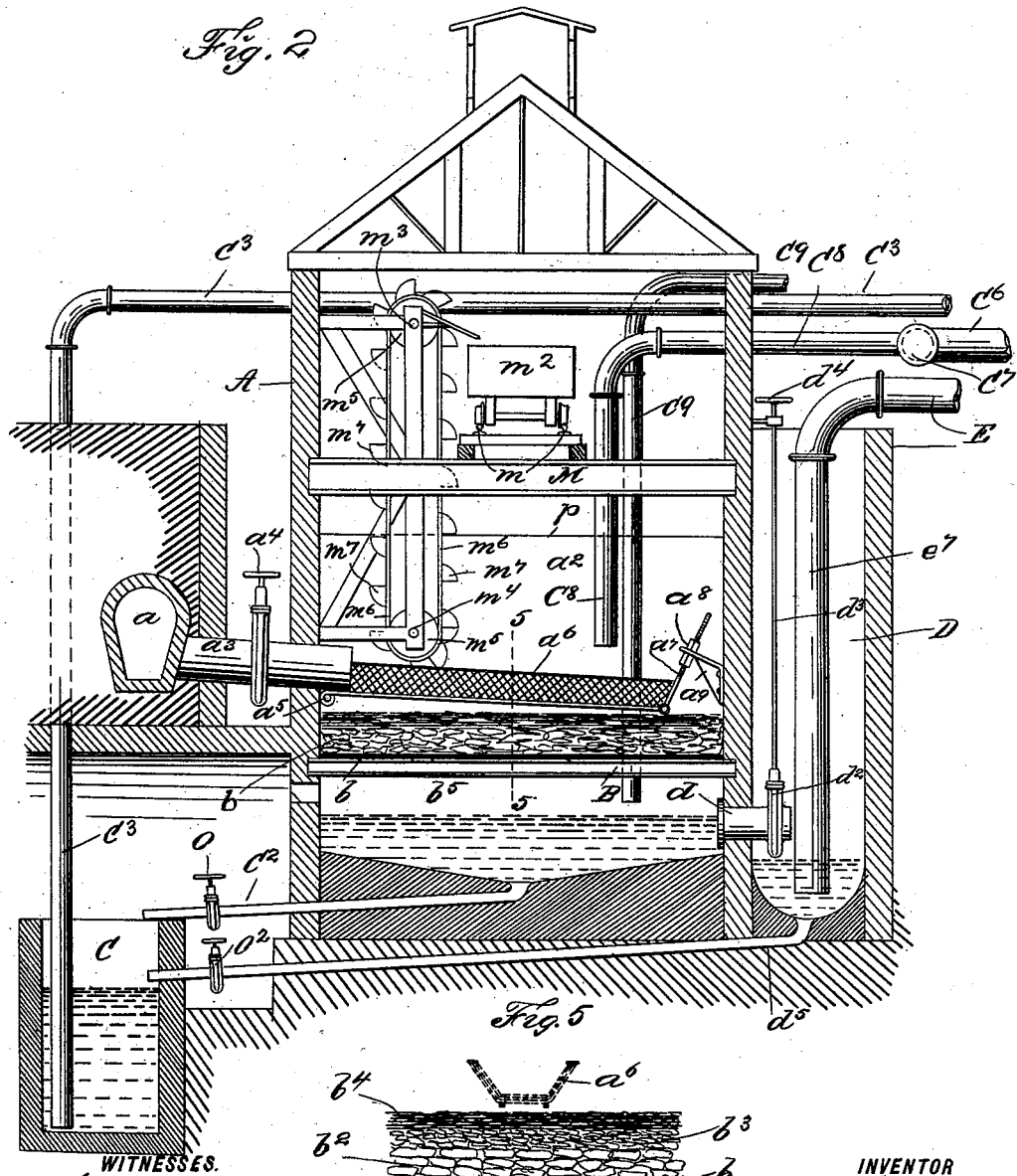

(No Model.)  3 Sheets—Sheet 3.
J. S. MILLER.
APPARATUS FOR PURIFYING SEWAGE WATER.
No. 603,221.  Patented Apr. 26, 1898.
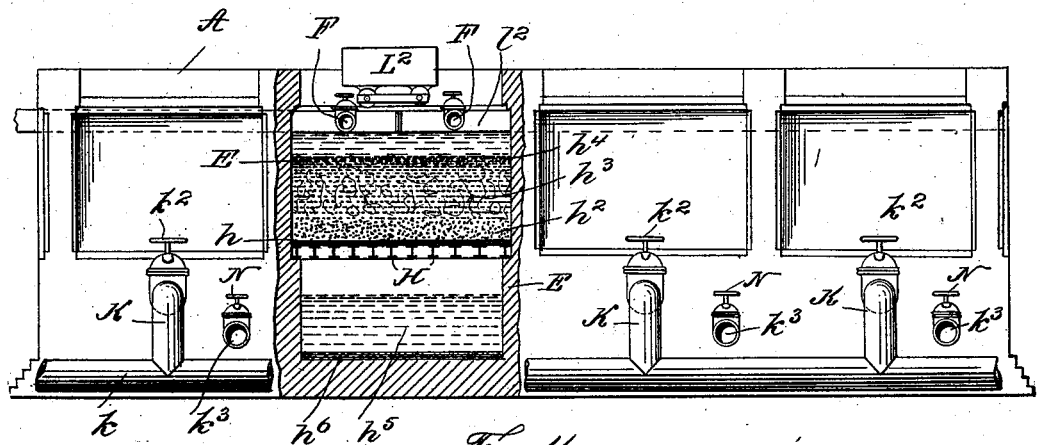
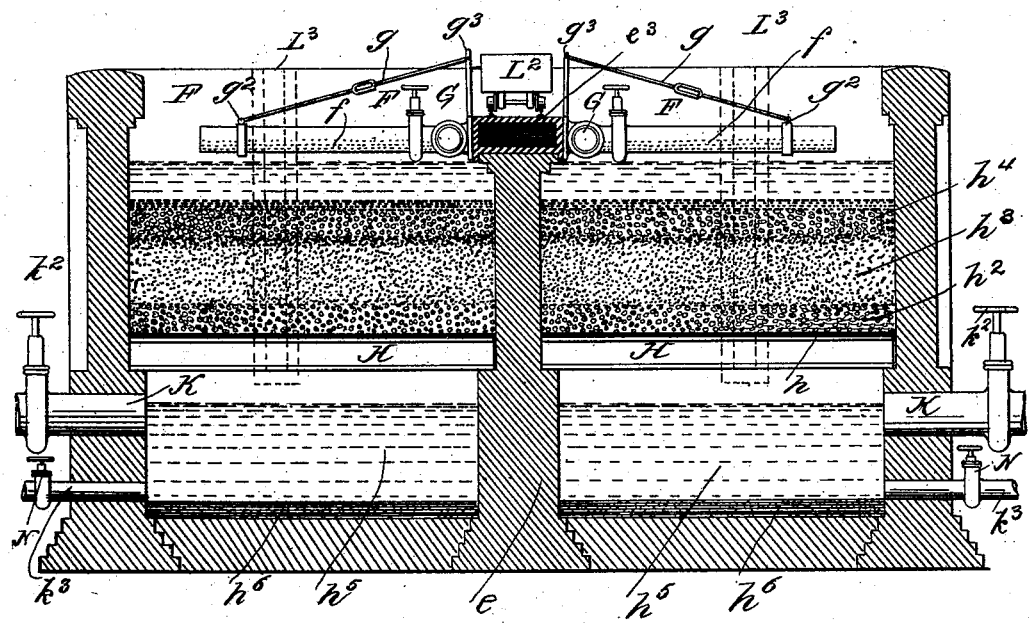

UNITED STATES PATENT OFFICE.

JAMES S. MILLER, OF READING, PENNSYLVANIA.

APPARATUS FOR PURIFYING SEWAGE-WATER.

SPECIFICATION forming part of Letters Patent No. 603,221, dated April 26, 1898.

Application filed July 10, 1897. Serial No. 644,102. (No model.)

*To all whom it may concern:*

Be it known that I, JAMES S. MILLER, a citizen of the United States, residing at Reading, in the county of Berks and State of Pennsylvania, have invented certain new and useful Improvements in Apparatus for Purifying Sewage-Water, of which the following is a full and complete specification, such as will enable those skilled in the art to which it appertains to make and use the same.

This invention relates to apparatus for purifying sewage-water; and the object thereof is to provide an improved apparatus for this purpose whereby sewage-water may be purified and used for any desired purpose and whereby the foul odors which are occasioned by the discharge of such water into the open air are prevented.

The invention is fully disclosed in the following specification, of which the accompanying drawings form a part, in which—

Figure 1 is a sectional plan or diagrammatic view of my improved apparatus; Fig. 2, a partial section on the line 2 2 of Fig. 1; Fig. 3, a sectional side view looking in the direction of the arrow $a$ of Fig. 1; Fig. 4, a section on the line 4 4 of Fig. 1, and Fig. 5 a section on the line 5 5 of Fig. 2.

In the drawings forming part of this specification the separate parts of my improvement are designated by the same letters of reference in each of the views, and in the practice of my invention I provide an apparatus for the purpose herein specified which consists of two separate buildings or structures A and $A^2$, the first of which contains the separating apparatus, whereby the bulky substances, such as paper and similar material, which will not filter are separated from the water, and the second of which contains the filtering apparatus proper.

My improved apparatus for the purpose herein specified is preferably located at the lowest point of the sewerage system the water of which it is desired to purify, and in Figs. 1 and 2 I have shown at $a$ a sewage-pipe, and the building A is provided with a plurality of compartments $a^2$, which, as shown in the drawings, reference being made to Figs. 1 and 2, are four in number, and communicating with each of these compartments and with the sewer $a$ are pipes $a^3$, each of which is provided with a valve $a^4$ of any preferred construction.

Hinged directly beneath the inner ends of each of the pipes $a^3$ in the compartments $a^2$, as shown at $a^5$, is a trough-shaped screen $a^6$, which is of the form shown in cross-section in Fig. 5, each of which consists of four layers of wire-netting, preferably composed of copper wire, and the free ends thereof are provided with upwardly-directed rods $a^7$, which are hinged thereto and which pass through adjusting-nuts $a^8$, which are supported by brackets $a^9$, secured to the wall of the compartments $a^2$ opposite that through which the pipes $a^3$ enter, and by means of this construction the free ends of the trough-shaped screens $a^6$ may be raised or lowered, as will be readily understood.

At a suitable distance below the trough-shaped screens $a^6$ the compartments $a^2$ are divided by transverse angle-irons B, which serve as beams or supports, and above the transverse angle-irons B is placed a wire screen $b$, consisting of a number of sheets of wire-netting, preferably composed of copper and of very fine mesh, while above the screen $b$, composed of copper, is a thick layer of coarse corncobs $b^2$, above which is placed a layer $b^3$ of finely-broken corncobs, and above the layer $b^3$ is placed a layer $b^4$ of straw, this construction being best shown in Fig. 5.

The water from the sewer $a$ passes into the trough-shaped screens $a^6$ and is filtered therethrough onto the layer of straw $b^4$, and said water passes through said layer of straw $b^4$, through the first layer of finely-broken cobs $b^3$, and then through the coarse layer of cobs $b^2$, and then through the wire netting or matting $b$ and falls into the slush-chambers $b^5$, one of which is placed beneath each of the compartments $a^2$.

Adjacent to the building A and preferably on the same side as the sewer is a flush-well C, and a pipe $C^2$ leads from the bottom of each of the slush-chambers $b^5$ and discharges into the flush-well, and another pipe $C^3$ extends downwardly into said flush-well and is carried upwardly and is in communication with the cylinder $C^4$ of an ordinary pump $C^5$, and the cylinder $C^4$ is provided with a pipe $C^6$, which is in communication with a pipe $C^7$, which is provided with four branches $C^8$, which extend inwardly through the adjacent wall of the building A and downwardly into the compartments $a^2$ and terminates over the screening composed of the layers $b^4$, $b^3$, $b^2$, and $b$ of straw, corncobs, and copper wire.

Arranged at the side of the building A, opposite the sewer-pipe $a$, is a receiver-well D, with which each of the slush-chambers $b^5$ communicate by means of a pipe $d$, each of which is provided with a valve $d^2$, which is operated by a rod $d^3$, which is provided at its upper end with a ring or handle $d^4$, and communicating with the bottom of the well D are pipes $d^5$, which communicate with the flush-well C.

I also provide means for conveying foul odors from the slush-chambers, which consist of a pipe $C^9$, which extends into said chambers, as shown in Fig. 2, and upwardly and out through one of the side walls of the building A, and in practice I connect a pump therewith by means of which the foul odors are drawn from said slush-chambers and forced into the furnace and used as a blast, and an ordinary fan-blower may be employed for this purpose, if desired, and by means of this arrangement the foul air from the slush-chambers or the odors with which the same is laden are consumed.

The second part of the apparatus, or that portion which is located in the building $A^2$, is also divided by transverse partitions E and by a central longitudinal partition $e$ into eight filtering-compartments $e^2$, and arranged upon the longitudinal partition $e$ is a conduit $e^3$, which is provided at one end with a pipe $e^4$, which is in communication with the cylinder $e^5$ of a pump $e^6$, and communicating with the cylinder $e^5$ of the pump $e^6$ is a pipe $e^7$, which extends downwardly into the bottom of the receiving-well D.

The conduit $e^3$ is provided with water-distributing pipes F, two of which are preferably employed in each of the filtering-chambers $e^2$, and these pipes are connected with the conduit $e^3$ by ball-and-socket joints G, and are supported at their outer ends by brace-rods $g$, which are connected therewith, as shown at $g^2$, and with standards $g^3$, secured to the sides of the conduit $e^3$, and the pipes F are finely perforated at the sides and bottom, as shown at $f$, and at a predetermined distance below the pipes F are arranged transverse beams H, of angle-iron, above which is placed a copper screen $h$, which is preferably composed of a plurality of layers of screens connected as shown and described in Fig. 5, and above the screen $h$ is placed a thick layer $h^2$ of gravel, above which is placed a thicker layer $h^3$ of sand, and above which is placed a layer $h^4$ of finer gravel than that at $h^2$, and beneath the beams H, by which the filtering material $h$, $h^2$, $h^3$, and $h^4$ is supported, are pure-water chambers $h^5$, provided with concrete bottoms $h^6$.

The water-chambers $h^5$ are each provided with pipes K, which are shown in Fig. 4 and which communicate with said chambers near the top thereof, and these pipes K on each side are in communication with a pipe $k$ and are provided with valves $k^2$, and in Fig. 1 the pipes K and $k$ are shown only on one side of the building $A^2$ and the compartments thereof are shown at the opposite side. The water-chambers $h^5$ are also provided with flush-pipes $k^3$, by which said chambers may be cleaned whenever desired, and it will be understood that the water when it passes from said chambers $h^5$ through the pipes K enters the pipe or pipes $k$ (shown in Figs. 1 and 3) and may be conveyed wherever desired for use.

Above the conduit $e^2$ and resting thereon is a railway-track composed of rails L, and I also provide a truck or car $L^2$, which is mounted on said track and by means of which the filtering material, consisting of the sand and gravel $h^2$, $h^3$, and $h^4$, may be removed from the building whenever desired and brought back when cleaned or purified, it being understood that whenever necessary this filtering material may be removed and cleansed and replaced in position or new filtering material may be substituted therefor, and the transverse partition-walls E of the filtering-compartments $e^2$ are provided with vertical air-conduits $L^3$, by which air may be conveyed or forced into the fresh-water chambers or compartments $h^5$, and the railway-track L is shown in Fig. 1, and the truck or car $L^2$ is shown in Fig. 3.

The separator-building A is also provided with transverse beams or girders M, on which is placed a track $m$, and a car or truck $m^2$ is placed on the track $m$, and arranged in said building adjacent to said track and above said car is a shaft $m^3$, and directly thereunder and just above the trough-shaped screens $a^6$ is another shaft $m^4$, and mounted on these shafts are wheels or drums $m^5$, on which are mounted bucket-chains $m^6$, and by means of this construction the separating material, composed of the straw $b^4$, the cobs $b^3$ and $b^2$, may be removed whenever desired, said material being shoveled into the buckets $m^7$, by which it is dumped into the truck or car $m^2$, and said screening material $b^4$, $b^3$, and $b^2$ may be removed whenever desired and may be used for fertilizing purposes, and new and clean material may be substituted therefor.

The operation will be readily understood from the foregoing description when taken in connection with the accompanying drawings and the following statement thereof.

The water passes from the sewer $a$, through the pipes $a^3$, into the trough-shaped screens $a^6$, and all the bulky substances, such as paper and other large particles of various kinds and classes, are received and retained in said trough-shaped screens. The water passes through said screens onto the screening material, composed of the straw $b^4$, the fine cobs $b^3$, the coarse cobs $b^2$, and the copper screen $b$, into the slush-chambers $b^5$. The heavier particles in the slush-water and the most impure water settles in the slush-chambers $b^5$ and passes into the flush-well C, while the purer water passes from said slush-chamber into the receiving-well D, and the impure water in the well C is pumped through the pipe $C^3$ and through the pipes $C^6$, $C^7$, and $C^8$ back into the separate chambers and again passes through the separating material $b^4$, $b^3$, and $b^2$. The water from the receiving-well D is pumped through the pipe $e^7$, through the pipe $e^4$, into the conduit $e^2$, and said water flows from said conduits through the finely-perforated distributing-pipes $f$ onto the filtering material, composed of the gravel $h^4$, the sand $h^3$, the coarse gravel $h^2$, and the copper screens $h$, into the pure-water chambers $h^5$, from which it passes through the pipes K into the pipes $k$. The flush-pipes $k^3$, which communicate with the bottom of the water-chambers $h^5$, are also provided, as will be seen, with valves N, and the pipes $C^2$, which extend from the slush-water chambers $b^5$ to the well C, are provided with valves O, and the pipe $d^5$, which extends from the bottom of the receiving-well D, is provided with a valve $O^2$.

The partition-walls in the building or structure A, by which the chambers $a^2$ are formed, are shown at P, and these walls may be of any desired height, and the beams M, which support the track-rails $m$, may also support a floor, if desired.

The water which passes through the pipes K from the pure-water chambers $h^5$ is suitable for any desired purpose and may be employed wherever pure water is necessary or desirable, and it will thus be seen that I accomplish the object of my invention by means of an apparatus which is simple in construction and operation and which is well adapted to produce the result for which it is intended.

It will also be seen that the filtering material in the filtering-chambers $e^2$ may be changed or cleansed whenever desired, and the separating material in the chambers $a^2$ may also be removed and new material substituted whenever desired, and many changes in and modifications of the construction herein described may be made without departing from the spirit of my invention or sacrificing its advantages.

Having fully described my invention, I claim as new and desire to secure by Letters Patent—

1. A water-purifying apparatus which is adapted for use in connection with a sewerage system, said apparatus consisting of a separating building or structure, and a filtering building or structure, said first-named structure being placed adjacent to a sewer, and being provided with separate compartments which are in communication with said sewer by means of pipes, said pipes being in connection with separating-troughs placed in said compartments below which is placed separating material, below which are formed slush-chambers, said separating structure being also provided adjacent to one side thereof, with a receiving-well, and also with a flush-well, said flush-well and said receiving-well being in communication with said slush-chambers; and said filtering structure being also provided with filtering-compartments, a conduit placed over said filtering-compartments and provided with pipes which discharge into each of said compartments, said filtering-compartments being also provided with filtering material in the bottom thereof, and said structure being provided with pure-water chambers beneath said filtering material, and means for pumping the water in said receiving-well adjacent to the separating structure into said conduit, substantially as shown and described.

2. A water-purifying apparatus which is adapted for use in connection with a sewerage system, said apparatus consisting of a separating building or structure, and a filtering building or structure, said first-named structure being placed adjacent to a sewer, and being provided with separate compartments which are in communication with said sewer by means of pipes, said pipes being in connection with separating-troughs, placed in said sewer below which is placed separating material, below which are formed slush-chambers, said separating structure being also provided adjacent to one side thereof, with a receiving-well, and also with a flush-well, said flush-well and said receiving-well being in communication with said slush-chambers, and said filtering structure being also provided with filtering-compartments, a conduit placed over said filtering-compartments and provided with pipes which discharge into each of said compartments, said filtering-compartments being also provided with filtering material in the bottom thereof, and said structure being provided with pure-water chambers beneath said filtering material, and means for pumping the water in said receiving-well adjacent to the separating structure into said conduit, and devices in connection with said separating structure for pumping the water from the flush-well back into the separating-compartments, substantially as shown and described.

3. The herein-described water-purifying apparatus adapted for use in connection with a sewerage system, said apparatus consisting of two structures, namely a separating building or structure and a filtering building or structure, said separating structure being provided with separating-compartments below which are placed slush-chambers, said compartments being in communication with a sewer, and said filtering building or structure being provided with filtering-compartments above which is placed a conduit, and which is provided with distributing-pipes, and with fresh-water chambers beneath said filtering-compartments, and means for conveying the water from the slush-chambers in the separating structure into said conduit, substantially as shown and described.

4. The herein-described water-purifying apparatus adapted for use in connection with a sewerage system, said apparatus consisting of two structures namely a separating building or structure and a filtering building or structure, said separating structure being provided with separating-compartments below which are placed slush-chambers, said compartments being in communication with a sewer, and said filtering building or structure being provided with filtering-compartments above which is placed a conduit, which is provided with distributing-pipes, and with fresh-water chambers beneath said filtering-compartments, and means for conveying the water from the slush-chambers in the separating structure into said conduit, said separating structure being also provided with a well which is in communication with said slush-chambers, and means for pumping the water from said well back into said separating-compartments, substantially as shown and described.

5. In an apparatus for purifying sewage-water, a building or structure provided with a plurality of separate compartments, means for supplying sewer-water to each of said compartments, an inclined and perforated trough in each of said compartments to one end of which the sewer-water is delivered, separating material forming the floor of said compartments, and a slush-compartment beneath said separate compartments, substantially as set forth.

6. In an apparatus for purifying sewage-water, a building or structure provided with separating-compartments which are in communication with a sewer, by means of pipes, said compartments being also provided with trough-shaped separators with which said pipes communicate, and beneath which are placed separating material through which the water passes into slush-chambers, said separating material consisting of straw, corncobs, and wire-screening, substantially as shown and described.

7. In an apparatus for purifying sewage-water, a building or structure provided with separating-compartments which are in communication with a sewer, by means of pipes, said compartments being also provided with trough-shaped separators with which said pipes communicate, and beneath which are placed separating material through which the water passes, into the slush-chambers, said separating material consisting of straw, corncobs, and wire-screening, and said separating-compartments being also provided with means for removing said separating material, substantially as shown and described.

8. An apparatus for purifying sewage-water, consisting of a separating building or structure provided with separating-compartments below which are placed slush-water compartments, said separating-compartments being provided with pipes which communicate with a sewer, and means for separating the coarser articles from the water, and another building or structure provided with filtering-chambers over which passes a conduit, and means for conveying the water from the slush-chambers of the separating structure into said conduit, said filtering-chambers being provided with means for filtering the water, substantially as shown and described.

9. In an apparatus for purifying water, a building or structure provided with separating devices whereby the bulky and coarser substances are removed from the water, and a filtering structure which is divided into separate filtering-chambers beneath which are pure-water chambers, said filtering-chambers being provided with filtering material in the bottom thereof, and with a conduit which extends longitudinally thereover, said conduit being provided with distributing-pipes which are perforated on their under sides, and said conduit being also in connection with devices for pumping the water from the separating-chambers thereinto, substantially as shown and described.

10. An apparatus for purifying sewage-water, adapted to be used in connection with a sewer, said apparatus consisting of two separate buildings or structures, the first of which is provided with means for separating the bulky and coarser substances from the water, and with filtering-compartments and means for filtering the water, and the second of which is provided with filtering-compartments, and devices whereby the water is conveyed from the first structure into the filtering-compartments of the second, substantially as shown and described.

11. An apparatus for purifying sewage-water, adapted to be used in connection with a sewer, said apparatus consisting of two separate buildings or structures, the first of which is provided with means for separating the bulky and coarser substances from the water, and with filtering-compartments and means for filtering the water, and the second of which is provided with filtering-compartments, and devices whereby the water is conveyed from the first structure into the filtering-compartments of the second, said devices for filtering the water consisting of thin layers of gravel and sand which are placed in the bottom of said filtering-compartments and below which are pure-water chambers which are in connection with water-pipes, substantially as shown and described.

12. An apparatus for purifying sewage-water, consisting of two buildings or structures one of which is placed adjacent to the sewer, and is provided with separating-compartments in which the bulky or coarser substances are separated from the water which passes into slush-chambers, a water-receiving well in communication with said slush-chambers, a flush-well in communication with said slush-chambers, and the other building or structure being provided with filtering-chambers, and means for conveying the water from said receiving-well into said filtering-chambers, substantially as shown and described.

13. An apparatus for purifying sewage-water, consisting of two buildings or structures one of which is placed adjacent to the sewer and is provided with separating-compartments in which the bulky or coarser substances are separated from the water which passes into the slush-chambers, a water-receiving well in communication with said slush-chambers, a flush-well in communication with said slush-chambers, and the other building or structure being provided with filtering-chambers, and means for conveying the water from said receiving-well into said filtering-chambers, and devices for pumping the water in said flush-well back in said separating-compartments, substantially as shown and described.

14. An apparatus for purifying sewage-water, consisting of two separate buildings or structures, one of which is provided with means for separating the bulky or coarser articles from the water, and a receiving-well into which the water passes, the other building or structure being provided with filtering-compartments, and a conduit into which the water from said well is preferably conveyed, said conduit being provided with perforated distributing-pipes which open into said filtering-compartments, and said filtering-compartments being provided with filtering material, consisting of gravel and sand which is placed in the bottom thereof, and said last-named building or structure being provided with pure-water chambers beneath said filtering-compartments, and with means for conveying the water therefrom, said chambers being also provided with flush-pipes, substantially as shown and described.

In testimony that I claim the foregoing as my invention I have signed my name, in presence of the subscribing witnesses, this 7th day of July, 1897.

JAMES S. MILLER.

Witnesses:
F. PIERCE HUMMEL,
G. HARRY SMITH.